US012117761B2

(12) United States Patent
Ikegami et al.

(10) Patent No.: US 12,117,761 B2
(45) Date of Patent: Oct. 15, 2024

(54) IMAGE FORMING APPARATUS WITH REVERSIBLE ROLLER AND SWITCHING ASSEMBLY

(71) Applicant: BROTHER KOGYO KABUSHIKI KAISHA, Nagoya (JP)

(72) Inventors: Yusuke Ikegami, Nagoya (JP); Yasuhiro Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/165,980

(22) Filed: Feb. 8, 2023

(65) Prior Publication Data

US 2023/0259065 A1 Aug. 17, 2023

(30) Foreign Application Priority Data

Feb. 17, 2022 (JP) ................................ 2022-023254

(51) Int. Cl.
*G03G 21/00* (2006.01)
*G03G 15/00* (2006.01)
(Continued)

(52) U.S. Cl.
CPC ....... *G03G 21/1647* (2013.01); *G03G 15/234* (2013.01); *G03G 15/6529* (2013.01);
(Continued)

(58) Field of Classification Search
CPC .. G03G 15/234; G03G 15/6529; G03G 15/80; G03G 21/1647; G03G 2215/00438;
(Continued)

(56) References Cited

U.S. PATENT DOCUMENTS

2015/0090563 A1* 4/2015 Uesugi ...................... F16H 3/60 198/791
2016/0334746 A1* 11/2016 Watanabe .......... G03G 15/6529
(Continued)

FOREIGN PATENT DOCUMENTS

JP 2009-073648 A 4/2009
JP 2020-059608 A 4/2020
JP 2020-140114 A 9/2020

*Primary Examiner* — Sophia S Chen
(74) *Attorney, Agent, or Firm* — Merchant & Gould P.C.

(57) ABSTRACT

An image forming apparatus, having an image forming device, a reversible roller rotatable in a first direction and a second direction, a motor, a switching assembly, is provided. The switching assembly has a planetary differential gear having an input gear, a first output gear, a second output gear, and a planetary gear; a first driving-force transmitter connecting the first output gear and the reversible roller; a second driving-force transmitter connecting the second output gear and the reversible roller; and a switcher. The switcher switches conditions of the switching assembly between a first condition, wherein the reversible roller is rotated in the first direction by the first output gear allowed to output the driving force to the first driving-force transmitter, and a second condition, wherein the reversible roller is rotated in the second direction by the second output gear allowed to output the driving force to the second driving-force transmitter.

20 Claims, 8 Drawing Sheets

(51) Int. Cl.
*G03G 15/23* (2006.01)
*G03G 21/16* (2006.01)

(52) U.S. Cl.
CPC ............. *G03G 2215/00438* (2013.01); *G03G 2221/1654* (2013.01); *G03G 2221/1657* (2013.01)

(58) Field of Classification Search
CPC ... G03G 2221/1654; G03G 2221/1657; B65H 29/58; B65H 2403/481
See application file for complete search history.

(56) References Cited

U.S. PATENT DOCUMENTS

| | | | | |
|---|---|---|---|---|
| 2016/0349678 | A1 | 12/2016 | Maeda et al. | |
| 2017/0267473 | A1* | 9/2017 | Watanabe .......... | G03G 21/1647 |
| 2017/0275110 | A1* | 9/2017 | Hashimoto ........ | G03G 15/6529 |
| 2020/0277155 | A1 | 9/2020 | Sano et al. | |
| 2022/0034384 | A1* | 2/2022 | Kai ........................ | B65H 5/062 |

* cited by examiner

| | SUN GEAR | INTERNAL GEAR | PLANETARY-GEAR CARRIER | OUTPUTTING ROTATION CATEGORY |
|---|---|---|---|---|
| R3 | INPUT | LOCKED | OUTPUT | REDUCED |
| R5 | LOCKED | INPUT | OUTPUT | |
| R2 | LOCKED | OUTPUT | INPUT | INCREASED |
| R1 | OUTPUT | LOCKED | INPUT | |
| R4 | INPUT | OUTPUT | LOCKED | REVERSE |
| R6 | OUTPUT | INPUT | LOCKED | |

IMAGE FORMING APPARATUS WITH REVERSIBLE ROLLER AND SWITCHING ASSEMBLY

REFERENCE TO RELATED APPLICATIONS

This application claims priority from Japanese Patent Application No. 2022-023254 filed on Feb. 17, 2022. The entire content of the priority application is incorporated herein by reference.

BACKGROUND ART

An image forming apparatus having an image forming device, an intermediate ejection roller, and an ejection roller, is known. The intermediate ejection roller and the ejection roller may be located downstream from the image forming device in a sheet-conveying direction and may convey a sheet exiting the image forming device to eject outside or to reenter the image forming device.

The intermediate ejection roller and the ejection roller may be driven by a motor, and in order to eject or invert the sheet, rotating directions of the intermediate ejection roller and the ejection roller may be switched between a forward direction and a reverse direction by switching rotating directions of the motor.

DESCRIPTION

In this image forming apparatus, the rotating directions of the motor may need to be switched each time the rotating directions of the intermediate ejection roller and the ejection roller are switched. Meanwhile, switching the rotating directions of the motor may require a certain length of time and may therefore lower throughput of the image forming apparatus.

While the rotating directions of the motor to drive the intermediate ejection roller and the ejection roller need to be switched frequently, it may be difficult to arrange the other drivable devices to be driven by the same motor. Therefore, the intermediate ejection roller and the ejection roller may be provided with a dedicated motor, which may increase manufacturing cost.

The present disclosure is advantageous in that an image forming apparatus having a common motor, which may drive an intermediate ejection roller, an ejection roller, and other drivable devices, and throughput for forming images while switching rotating directions of the intermediate ejection roller and the ejection roller may be restrained from lowering, is provided.

In the following paragraphs, embodiments of the present disclosure will be described with reference to the accompanying drawings.

[Image Forming Apparatus]

Figure 1:
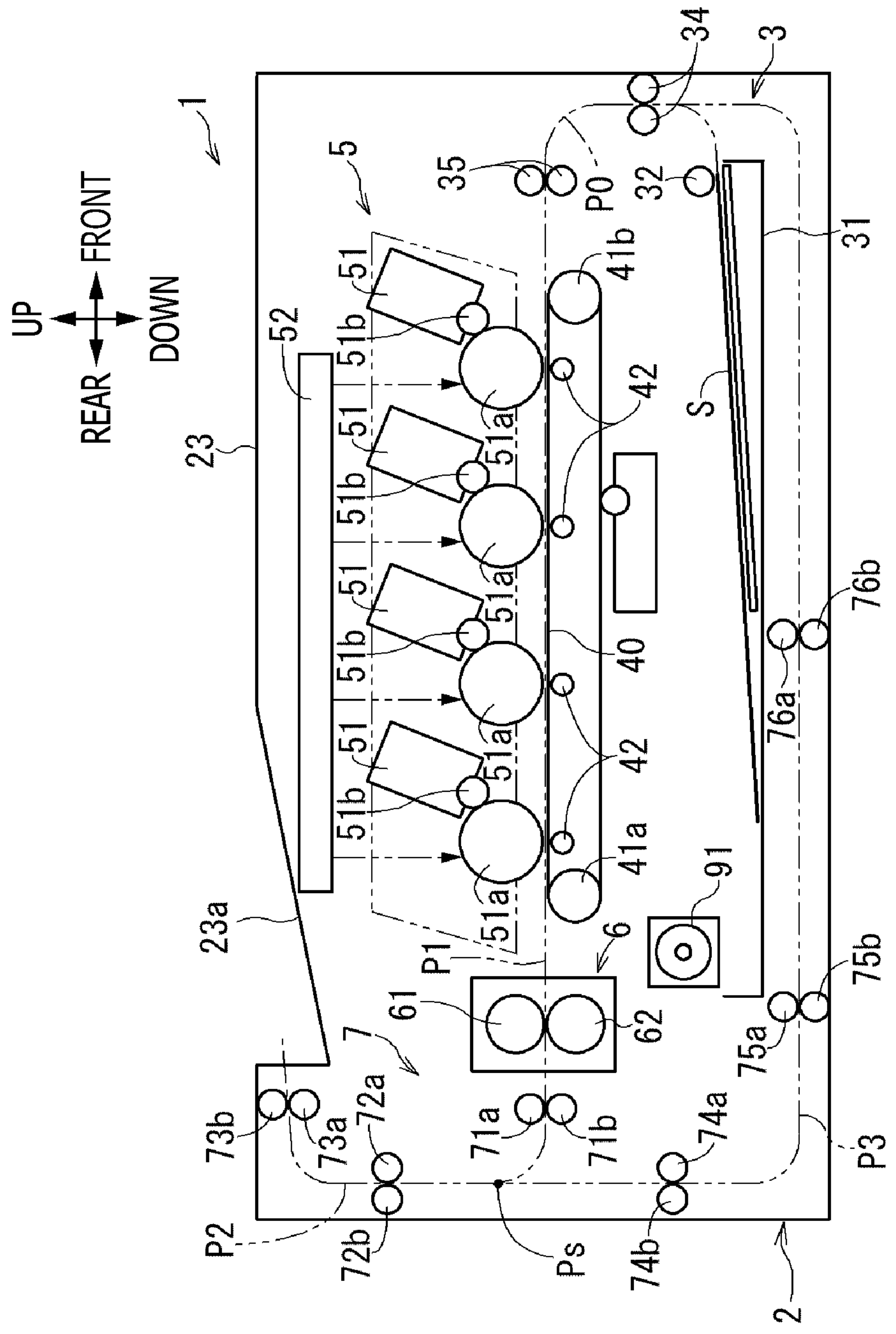
FIG. 1 is a cross-sectional view of an image forming apparatus.

An image forming apparatus 1 shown in FIG. 1 is a color laser printer, which may form multicolored images by layering images in developing agent in multiple colors on sheets S such as paper sheets and OHP sheets. Optionally, however, the image forming apparatus 1 may be a monochrome laser printer for forming images in a single color on the sheets. For another example, the image forming apparatus may not necessarily be a laser printer but may be an inkjet printer.

In the following description, a right-hand side and a left-hand side in FIG. 1 to a viewer will be defined as a front side and a rear side, respectively, of an image forming apparatus 1, and a nearer side and a farther side to the viewer with respect to a cross section in FIG. 1 will be defined as a leftward side and a rightward side, respectively, of the image forming apparatus 1. An upper side and a lower side in FIG. 1 will be defined as an upper side and a lower side, respectively, of the image forming apparatus 1. A front-to-rear or rear-to-front direction may be called as a front-rear direction, a left-to-right or right-to-left direction may be called as a widthwise direction, and an up-to-down or down-to-up direction may be called as a vertical direction.

The image forming apparatus 1 has a main body 2, a feeder 3 for feeding sheets S, an image forming device 5 for forming images on the sheets S being conveyed, and a conveyer 7 for conveying the sheets S exiting the image forming device 5. The main body has a form of a substantially rectangular box and accommodates the feeder 3, the image forming device 5, and the conveyer 7. On a top face 23 of the main body 2, an ejection tray 23*a* which slants to be lower toward the rear side is formed.

The feeder 3 includes a sheet cassette 31, a feeder roller 32, a conveyer roller pair 34, and a registration roller pair 35. In the main body 2, a feeding path P0 to feed the sheets S from the sheet cassette 31 to the image forming device 5 is formed.

The sheet cassette 31 may support a plurality of sheets S in a stack. The sheets S supported by the sheet cassette 31 may be fed by the feeder roller 32 to the feeding path P0 one by one. The sheets S fed to the feeding path P0 may be conveyed by the conveyer roller pair 34 and the registration roller pair 35 toward the image forming device 5.

The image forming device 5 includes four (4) drum units 51, which align in the front-rear direction. The drum units 51 are provided to correspond to colors of black, yellow, magenta, and cyan, on one-to-one basis. Each drum unit 51 includes a photosensitive drum 51*a* and a developing roller 51*b*.

The image forming device 5 includes a scanner unit 52. The scanner unit 52 is located at an upper position in the main body 2 and may emit laser beams according to image data at the photosensitive drums 51*a* through polygon mirrors, lenses, and reflection mirrors. The emitted laser beams may irradiate and scan surfaces of the photosensitive drums 51*a*.

In a lower area with respect to the drum units 51 in the image forming device 5, a transfer belt 40 is arranged. The transfer belt 40 is strained around a driving roller 41*a* and a driven roller 41*b* located frontward from the driving roller 41*a*. At positions to face the photosensitive drums 51*a* across the transfer belt 40, transfer rollers 42 are arranged.

In the image forming device 5, the photosensitive drums 51*a* charged evenly by chargers (not shown) may be selectively exposed to the laser beams emitted from the scanner unit 52. The exposing beams may selectively remove the charges from surfaces of the photosensitive drums 51*a*, and electrostatic latent images as selected may be formed on the surfaces of the photosensitive drums 51*a*.

Meanwhile, developing bias is applied to the developing rollers 51*b*. When the electrostatic latent images formed on the photosensitive drums 51*a* come to face the respective developing rollers 51*b*, due to potential difference between the electrostatic latent images and the developing rollers 51*b*, the toners may be supplied from the developing rollers 51*b* to the electrostatic latent images. Thus, images in the toners may be formed on the surfaces of the photosensitive drums 51*a*.

The sheet S conveyed to the image forming device 5 may be further conveyed by the transfer belt 40 through the image forming device 5 in the area between the transfer belt 40 and the photosensitive drums 51*a*. As the sheet S travels through the positions between the transfer belt 40 and the photosensitive drums 51*a*, the toner images on the photosensitive drums 51*a* may be transferred onto the sheet S one by one with transfer bias applied to the transfer rollers 42.

A fuser 6 is located in a conveyer path P1 at a position downstream from the image forming device 5 in a sheet-conveying direction. The fuser 6 includes a heat roller 61 and a pressure roller 62 pressed against the heat roller 61.

The sheet S with the toner images transferred thereon may be conveyed further by the fuser 6. As the sheet S travels through a position between the heat roller 61 and the pressure roller 62, the toner images may be fused and fixed to the sheet S.

The sheet S with the toner images fixed thereon may be conveyed further by the conveyer 7 downstream in the sheet-conveying direction from the fuser 6. The conveyer 7 includes the conveyer path P1, an ejecting path P2, and a duplex conveyer path P3. The conveyer path P1 is a path, in which the sheet S may travel to be conveyed from the image forming device 5 to a position downstream from the fuser 6. The ejecting path P2 is a path, in which the sheet S may travel to be conveyed to the ejection tray 23*a*, and branches off from the conveyer path P1 at a branch point Ps. The duplex conveyer path P3 is a path, in which the sheet S may travel to be conveyed to reenter the image forming device 5, and branches off from the conveyer path P1 and the ejecting path P2 at the branch point Ps.

At a position in the conveyer path P1 downstream from the fuser 6 in the sheet-conveying direction, a post-fuse roller 71*a* and a driven roller 71*b* located to face the post-fuse roller 71*a* are arranged.

In a downstream end region in the ejecting path P2 in the sheet-conveying direction, an ejection roller 73*a* to convey the sheet S and a driven roller 73*b* located to face the ejection roller 73*a* are arranged. At a position in the ejecting path P2 upstream from the ejection roller 73*a* and the driven roller 73*b* in a sheet-conveying direction to eject the sheet S, an intermediate ejection roller 72*a* to convey the sheet S and a driven roller 72*b* located to face the intermediate ejection roller 72*a* are arranged.

The intermediate ejection roller 72*a* and the ejection roller 73*a* are located downstream from the image forming device 5 and the fuser 6 in the sheet-conveying direction to eject the sheet S. The intermediate ejection roller 72*a* and the ejection roller 73*a* are rotatable in one way and the other way opposite to the one way, i.e., bidirectionally.

In the duplex conveyer path P3, an intermediate reversible roller 74*a* and a driven roller 74*b* located to face the intermediate reversible roller 74*a*, a first duplex conveyer roller 75*a* and a driven roller 75*b* located to face the first duplex conveyer roller 75*a*, and a second duplex conveyer roller 76*a* and a driven roller 76*b* located to face the second duplex conveyer roller 76*a* are arranged.

The first duplex conveyer roller 75*a* and the driven roller 75*b* are located downstream in the sheet-conveying direction from the intermediate reversible roller 74*a* and the driven roller 74*b*. The second duplex conveyer roller 76*a* and the driven roller 76*b* are located downstream in the sheet-conveying direction from the first duplex conveyer roller 75*a* and the driven roller 75*b*.

The image forming apparatus 1 has a motor 91. The motor 91 is a driving source to drive drivable devices in the image forming apparatus 1, which include the feeder roller 32, the post-fuse roller 71*a*, the intermediate ejection roller 72*a*, the ejection roller 73*a*, the intermediate reversible roller 74*a*, the first duplex conveyer roller 75*a*, the second duplex conveyer roller 76*a*, and the heat roller 61.

The intermediate ejection roller 72*a* and the ejection roller 73*a* drivable by the motor 91 are rotatable bidirectionally in a forward direction and a reverse direction which is opposite to the forward direction. The intermediate ejection roller 72*a* and the ejection roller 73*a* may convey the sheet S toward the ejection tray 23*a* when rotating in the forward direction so that the conveyed sheet S may be ejected at the ejection tray 23*a*. On the other hand, the intermediate ejection roller 72*a* and the ejection roller 73*a* may convey the sheet S toward the duplex conveyer path P3 when rotating in the reverse direction. In this arrangement, directions to convey the sheet S in the ejecting path P2 are switchable between a first direction, which is one of the forward direction and the reverse direction, and a second direction, which is opposite to the first direction and the other of the forward direction and the reverse direction.

[Switching Assembly]

Figure 2A:
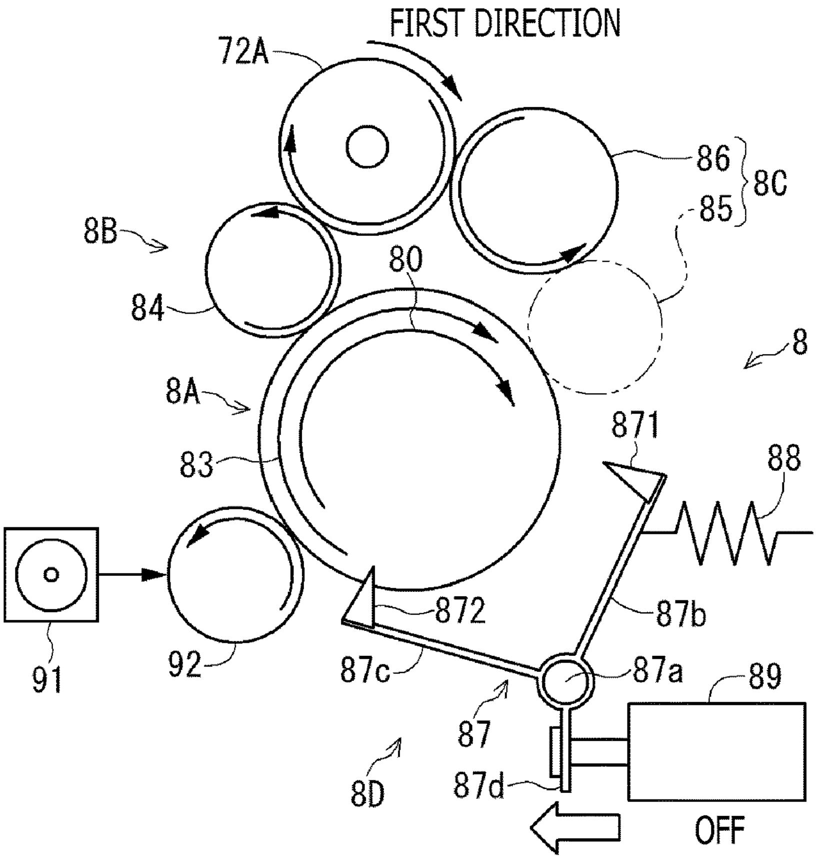
FIG. 2A is a sideward view of a switching assembly with a switcher in a first condition.
Figure 2B:
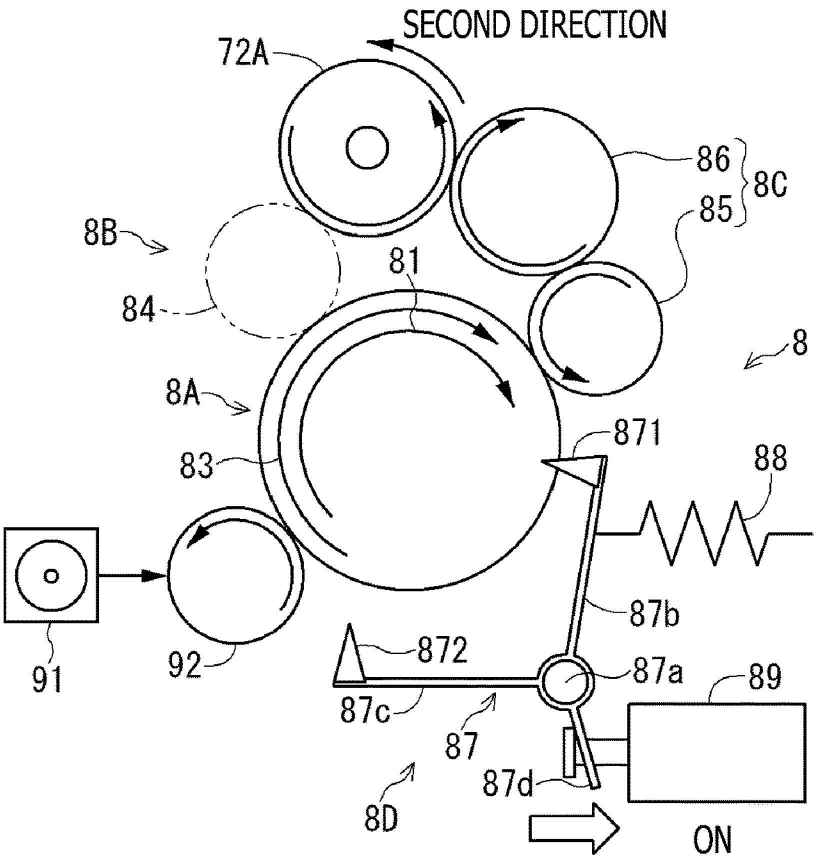
FIG. 2B is a sideward view of the switching assembly with the switcher in a second condition.

The image forming apparatus 1 has a switching assembly 8, as shown in FIGS. 2A-2B, which may switch the rotating directions of the intermediate ejection roller 72*a* from one to the other in a state where the motor 91 is rotating in one direction. The switching assembly 8 includes a planetary differential gear 8A, a first driving-force transmitter 8B, a second driving-force transmitter 8C, and a switcher 8D.

The driving force from the motor 91 may be input, through a driving gear 92 connected with the motor 91, to the planetary differential gear 8A. The planetary differential gear 8A may output the driving force from the motor 91 to the first driving-force transmitter 8B and the second driving-force transmitter 8C.

Figure 3:
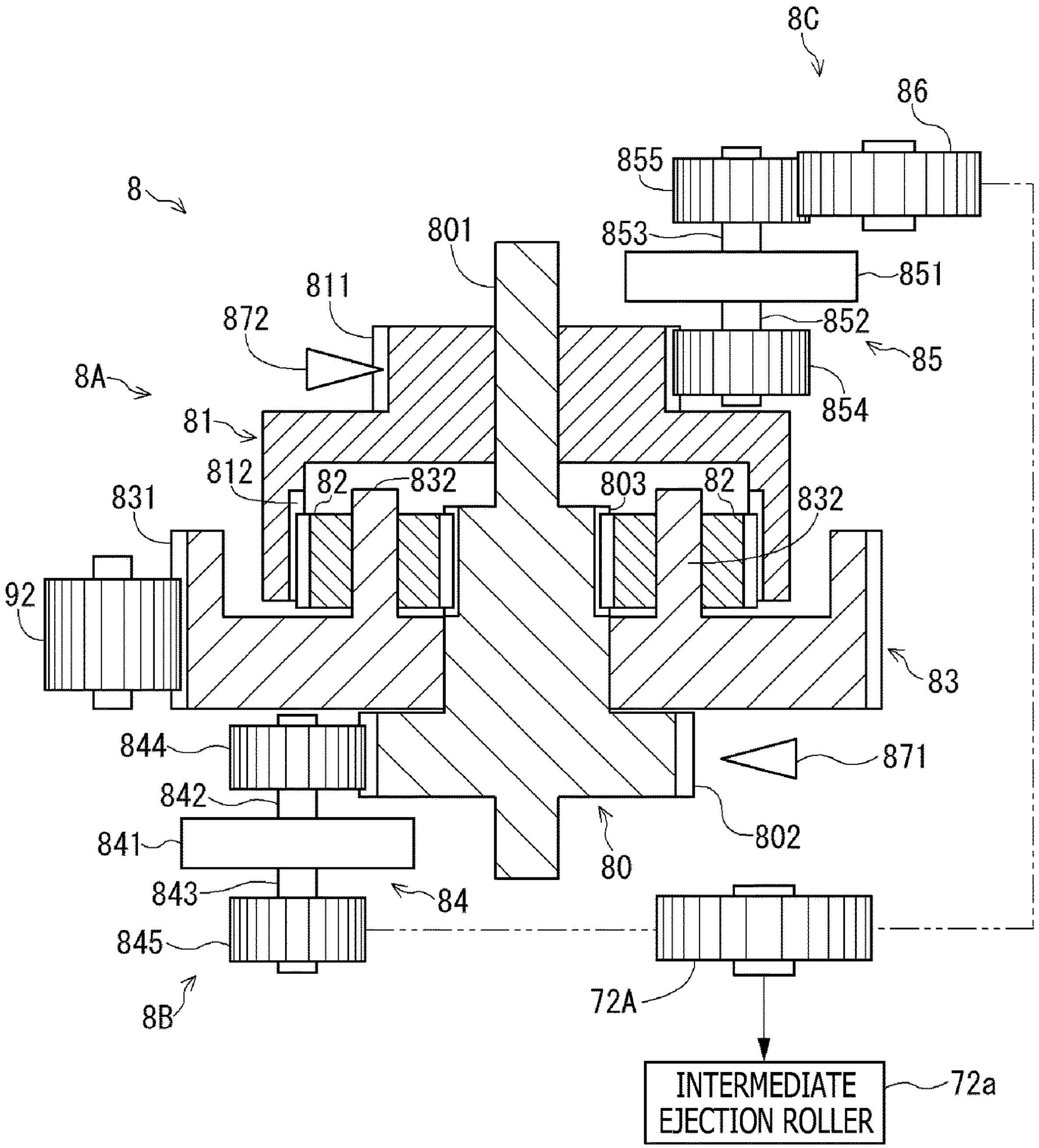
FIG. 3 is a cross-sectional planar view of the switching assembly.

As shown in FIG. 3, the planetary differential gear 8A includes a sun gear 80, an internal gear 81, at least one planetary gear 82, and a planetary-gear carrier 83. The sun gear 80 includes a rotation shaft 801, and a first sun gear 802 and a second sun gear 803 which are rotatable integrally with the rotation shaft 801. The internal gear 81 is rotatably supported by the rotation shaft 801 and includes outer teeth 811 formed on an outer circumferential surface and inner teeth 812 formed on an inner circumferential surface.

The planetary gear 82 is located between the second sun gear 803 of the sun gear 80 and the inner teeth 812 of the internal gear 81 and meshes with both of the second sun gear 803 and the inner teeth 812. The planetary differential gear 8A has a plurality of planetary gears 82.

The planetary-gear carrier 83 is rotatably supported by the rotation shaft 801 and includes a carrier gear 831 and supporting shafts 832. The supporting shafts 832 retain the planetary gears 82 rotatably, and each planetary gear 82 is rotatable on one of the supporting shafts 832. The planetary-gear carrier 83 rotating on the rotation shaft 801 may move the planetary gears 82 to revolve around the rotation shaft 801.

The carrier gear 831 meshes with the driving gear 92, and the driving force from the motor 91 may be transmitted to the carrier gear 831 through the driving gear 92. The planetary gears 82 may transmit the driving force from the carrier gear 831 to the sun gear 80 and the internal gear 81.

In the planetary differential gear 8A, when, for example, the internal gear 81 is in a locked condition, and when the driving force is transmitted to the planetary-gear carrier 83, the planetary-gear carrier 83 may rotate, the planetary gears 82 retained by the planetary-gear carrier 83 may rotate, and the sun gear 80 meshed with the planetary gears 82 may rotate. In this arrangement, the planetary gears 82 may rotate in a direction opposite to a rotating direction of the planetary-gear carrier 83, and the sun gear 80 may rotate in the same rotating direction as the rotating direction of the planetary-gear carrier 83 in an increased speed (see row R1 in FIG. 4). As the sun gear 80 rotates, the driving force may be output from the sun gear 80.

When, for another example, the sun gear 80 is in a locked condition, and when the driving force is transmitted to the planetary-gear carrier 83, the planetary-gear carrier 83 may rotate, the planetary gears 82 retained by the planetary-gear carrier 83 may rotate, and the internal gear 81 meshed with the planetary gears 82 may rotate. In this arrangement, the planetary gears 82 may rotate in the same direction as the rotating direction of the planetary-gear carrier 83, and the internal gear 81 may rotate in the same direction as the rotating direction of the planetary-gear carrier 83 in the increased speed (see row R2 in FIG. 4). As the internal gear 81 rotates, the driving force may be output from the internal gear 81.

The planetary-gear carrier 83 may thus rotate when the driving force from the motor 91 is transmitted thereto to work as an input gear. The planetary-gear carrier 83 meshes with the driving gear 92. Meanwhile, the sun gear 80 may work as a first output gear to output the driving force, and the internal gear 81 may work as a second output gear to output the driving force.

The first driving-force transmitter 8B includes a first two-way clutch 84. The first driving-force transmitter 8B may consist of the first two-way clutch 84 alone. The first two-way clutch 84 includes a clutch body 841, a first shaft 842, a second shaft 843, a first gear 844, and a second gear 845.

The first shaft 842 is rotatably supported by the clutch body 841. The first gear 844 is fixed to the first shaft 842 and is rotatable integrally with the first shaft 842. The second shaft 843 is rotatably supported by the clutch body 841. The second gear 845 is fixed to the second shaft 843 and is rotatable integrally with the second shaft 843.

The first gear 844 meshes with the first sun gear 802 of the sun gear 80, and the first shaft 842 is connected with the sun gear 80 through the first gear 844. In other words, the first gear 844 meshes with the sun gear 80 being the first output gear, and the first shaft 842 is connected with the first output gear.

The image forming apparatus 1 has a roller gear 72A, which may rotate integrally with the intermediate ejection roller 72*a*. The roller gear 72A meshes with the second gear 845. Through the second gear 845 and the roller gear 72A, the intermediate ejection roller 72*a* is connected with the second shaft 843. The roller gear 72A is rotatable bidirectionally.

The first two-way clutch 84 may transmit the driving force transmitted to the first shaft 842 to the second shaft 843 through the clutch body 841 but may not transmit the driving force transmitted to the second shaft 843 to the first shaft 842 through the clutch body 841. Therefore, when the driving force is transmitted from the first sun gear 802 to the first gear 844, the driving force may be transmitted from the first gear 844 to the second gear 845. On the other hand, when the driving force is transmitted from the roller gear 72A to the second gear 845, the driving force may not be transmitted from the second gear 845 to the first gear 844.

In other words, the first driving-force transmitter 8B has the first two-way clutch 84 forming a gear train, which connects the sun gear 80 and the intermediate ejection roller 72*a*, and which may transmit the driving force input from the sun gear 80 to the intermediate ejection roller 72*a* but not transmit the driving force input from the intermediate ejection roller 72*a* to the sun gear 80. The first driving-force transmitter 8B forms a gear train connecting the sun gear 80 and the intermediate ejection roller 72*a*.

The second driving-force transmitter 8C includes a second two-way clutch 85 and an idle gear 86. In other words, the second driving-force transmitter 8C may consist of the second two-way clutch 85 and the idle gear 86. The second two-way clutch 85 includes a clutch body 851, a third shaft 852, a fourth shaft 853, a third gear 854, and a fourth gear 855.

The third shaft 852 is rotatably supported by the clutch body 851. The third gear 854 is fixed to the third shaft 852 and is rotatable integrally with the third shaft 852. The fourth shaft 853 is rotatably supported by the clutch body 851. The fourth gear 855 is fixed to the fourth shaft 853 and is rotatable integrally with the fourth shaft 853.

The third gear 854 meshes with the outer teeth 811 of the internal gear 81, and the third shaft 852 is connected with the internal gear 81 through the third gear 854. In other words, the third gear 854 meshes with the internal gear 81 being the second output gear, and the third shaft 852 is connected with the second output gear.

The idle gear 86 meshes with the roller gear 72A, and the fourth gear 855 meshes with the idle gear 86. The fourth shaft 853 is connected with the intermediate ejection roller 72*a* through the fourth gear 855, the idle gear 86, and the roller gear 72A.

The second two-way clutch 85 may transmit the driving force transmitted to the third shaft 852 to the fourth shaft 853 through the clutch body 851 but may not transmit the driving force transmitted to the fourth shaft 853 to the third shaft 852 through the clutch body 851. Therefore, when the driving force is transmitted from the outer teeth 811 to the third gear 854, the driving force may be transmitted from the third gear 854 to the fourth gear 855. On the other hand, when the driving force is transmitted from the roller gear 72A to the fourth gear 855, the driving force may not be transmitted from the fourth gear 855 to the third gear 854.

In other words, the second driving-force transmitter 8C has the second two-way clutch 85 forming a gear train, which connects the internal gear 81 being the second output gear and the intermediate ejection roller 72*a*, and which may transmit the driving force input from the internal gear 81 to the intermediate ejection roller 72*a* but not transmit the driving force input from the intermediate ejection roller 72*a* to the internal gear 81.

The switcher 8D includes a clutch lever 87, a contracting spring 88, and a solenoid 89. The clutch lever 87 has a pivot center 87*a*; a first lever 87*b*, a second lever 87*c*, and a third lever 87*d*, which are pivotable on the pivot center 87*a*; a first engageable claw 871 fixed to the first lever 87*b*; and a second engageable claw 872 fixed to the second lever 87*c*.

The first lever 87*b*, the second lever 87*c*, and the third lever 87*d* extend radially outward from the pivot center 87*a* at different phases in this given order in a counterclockwise direction in FIGS. 2A-2B. In a circumferential direction centered around the pivot center 87*a*, a planetary differential gear 8A is located between the first lever 87*b* and the second lever 87*c*.

The first engageable claw 871 may engage with the first sun gear 802 of the sun gear 80 to suspend rotation of the sun gear 80. The second engageable claw 872 may engage with the outer teeth 811 of the internal gear 81 to suspend rotation of the internal gear 81. In other words, the first engageable claw 871 may engage with the first output gear, and the second engageable claw 872 may engage with the second output gear.

The clutch lever 87 may pivot on the pivot center 87*a* to move between a first position (see FIG. 2A), at which the first engageable claw 871 is separated from the sun gear 80 in the planetary differential gear 8A and the second engageable claw 872 engages with the internal gear 81 in the planetary differential gear 8A, and a second position (see FIG. 2B), at which the first engageable claw 871 engages with the sun gear 80 in the planetary differential gear 8A and the second engageable claw 872 is separated from the internal gear 81 in the planetary differential gear 8A.

The contracting spring 88 is connected with the first lever 87*b* and urges the clutch lever 87 to be located at the first position. The solenoid 89 is connected with the third lever 87*d* and may move the clutch lever 87 from the first position toward the second position.

Figures 4, 5:
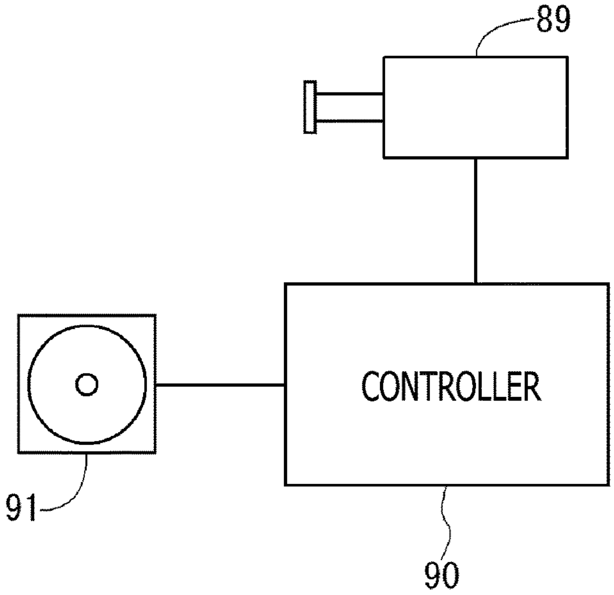
FIG. 4 illustrates input/output functions of gears in a planetary differential gear.
FIG. 5 is a block diagram to illustrate a controller connected with a motor and a solenoid.

As shown in FIG. 5, the image forming apparatus 1 has a controller 90 connected with the motor 91 and the solenoid 89. The controller 90 may control behaviors of the motor 91 and the solenoid 89. The controller 90 may activate the solenoid 89 to cause the solenoid 89 to move the clutch lever 87 from the first position to the second position.

[Behaviors of Switching Assembly 8]

As shown in FIG. 2A, when the solenoid 89 is inactive, the switcher 8D places the switching assembly 8 in a first condition, in which the clutch lever 87 is urged by the contracting spring 88 to be located at the first position, the first engageable claw 871 is separated from the sun gear 80, the sun gear 80 is allowed to rotate, and the second engageable claw 872 engages with the internal gear 81 to suspend rotation of the internal gear 81.

In the first condition, as the motor 91 rotates counterclockwise, the driving force from the motor 91 may be transmitted to the planetary-gear carrier 83, and the planetary-gear carrier 83 may rotate clockwise. Thereby, the sun gear 80 may rotate clockwise, and the driving force may be output from the sun gear 80 to the first driving-force transmitter 8B. Meanwhile, the internal gear 81 is suspended by the second engageable claw 872 not to rotate; therefore, the driving force may not be output from the internal gear 81 to the second driving-force transmitter 8C.

As the driving force output to the sun gear 80 is transmitted to the first gear 844 of the first two-way clutch 84 in the first driving-force transmitter 8B, the driving force may be transmitted from the first gear 844 to the second gear 845. In this arrangement, the first gear 844 and the second gear 845 may rotate counterclockwise. As the second gear 845 rotates counterclockwise, the driving force may be transmitted to the roller gear 72A and the intermediate ejection roller 72*a*, and the roller gear 72A and the intermediate ejection roller 72*a* may rotate clockwise.

The direction, in which the roller gear 72A and the intermediate ejection roller 72*a* rotate in the first condition, e.g., the clockwise direction as indicated in FIG. 2A, may be herein called as a first direction. In other words, the roller gear 72A and the intermediate ejection roller 72*a* may rotate in the first direction in the first condition.

As the roller gear 72A rotates in the first direction, e.g., clockwise, the idle gear 86 meshing with the roller gear 72A in the second driving-force transmitter 8C may rotate counterclockwise, and the driving force may be transmitted from the roller gear 72A to the fourth gear 855 in the second two-way clutch 85. However, the driving force transmitted from the roller gear 72A to the fourth gear 855 may not be transmitted to the third gear 854. Therefore, the third gear 854 meshing with the outer teeth 811 of the internal gear 81 may be maintained motionless without rotating.

As shown in FIG. 2B, when the solenoid 89 is activated by the controller 90, the switcher 8D places the switching assembly 8 in a second condition, in which the clutch lever 87 is moved by the solenoid 89 from the first position to the second position, the first engageable claw 871 engages with the sun gear 80, the sun gear 80 is suspended not to rotate, and the second engageable claw 872 is separated from the internal gear 81 to allow the internal gear 81 to rotate.

In the second condition, as the motor 91 rotates counterclockwise, which is the same rotating direction as the first condition, the driving force from the motor 91 may be transmitted to the planetary-gear carrier 83, and the planetary-gear carrier 83 may rotate clockwise. Thereby, the internal gear 81 may rotate clockwise, and the driving force may be output from the internal gear 81 to the second driving-force transmitter 8C. Meanwhile, the sun gear 80 is suspended by the first engageable claw 871 not to rotate; therefore, the driving force may not be output from the sun gear 80 to the first driving-force transmitter 8B.

As the driving force output from the internal gear 81 is transmitted to the third gear 854 of the second two-way clutch 85 in the second driving-force transmitter 8C, the driving force may be transmitted from the third gear 854 to the fourth gear 855. In this arrangement, the third gear 854 and the fourth gear 855 may rotate counterclockwise. As the fourth gear 855 rotates counterclockwise, the driving force may be transmitted to the roller gear 72A and the intermediate ejection roller 72*a* through the idle gear 86. The idle gear 86 may rotate clockwise, and the roller gear 72A and the intermediate ejection roller 72*a* may rotate counterclockwise.

The direction, in which the roller gear 72A and the intermediate ejection roller 72*a* rotate in the second condition, e.g., the counterclockwise direction as indicated in FIG. 2B, which is opposite to the first direction, may be herein called as a second direction. In other words, the roller gear 72A and the intermediate ejection roller 72*a* may rotate in the second direction in the second condition.

As the roller gear 72A rotates in the second direction, e.g., counterclockwise, the driving force may be transmitted from the roller gear 72A to the second gear 845 in the first two-way clutch 84 meshing with the roller gear 72A. However, the driving force transmitted from the roller gear 72A to the second gear 845 may not be transmitted to the first gear 844.

Therefore, the first gear 844 meshing with the first sun gear 802 of the sun gear 80 may be maintained motionless without rotating.

Thus, the switcher 8D may switch the conditions of the switching assembly 8 between the first condition, in which the intermediate ejection roller 72*a* is rotated in the first direction by allowing the sun gear 80 being the first output gear to output the driving force to the first driving-force transmitter 8B and suspending the internal gear 81 being the second output gear not to output the driving force to the second driving-force transmitter 8C, and the second condition, in which the intermediate ejection roller 72*a* is rotated in the second direction by suspending the sun gear 80 not to output the driving force to the first driving-force transmitter 8B and allowing the internal gear 81 to output the driving force to the second driving-force transmitter 8C.

In this arrangement, without switching the rotating directions of the motor 91, the rotating directions of the intermediate ejection roller 72*a* may be switched, and throughput for printing images in the image forming apparatus 1 may be restrained from lowering. Moreover, the motor 91 being the driving source to drive the intermediate ejection roller 72*a* may be used commonly as the driving source to drive the other drivable devices including the feeder roller 32, the post-fuse roller 71*a*, the intermediate reversible roller 74*a*, the first duplex conveyer roller 75*a*, the second duplex conveyer roller 76*a*, and the heat roller 61; therefore, manufacturing cost of the image forming apparatus 1 may be reduced.

In this arrangement, the switcher 8D may suspend rotation of one of the sun gear 80 being the first output gear and the internal gear 81 being the second output gear alternatively. Therefore, output of the driving force from one of the sun gear 80 and the internal gear 81 may be easily suspended.

Moreover, the switching assembly 8 has the first two-way clutch 84 in the first driving-force transmitter 8B and the second two-way clutch 85 in the second driving-force transmitter 8C. Therefore, unlike an arrangement, in which the first driving-force transmitter 8B and the second driving-force transmitter 8C have electromagnetic clutches, no power source or a controller to operate the electromagnetic clutches may be required. In other words, the switching assembly 8 may be provided in a less complicated configuration. In the meantime, optionally, electromagnetic clutches may be used to work as the clutches in the first driving-force transmitter 8B and the second driving-force transmitter 8C.

In the switching assembly 8, the clutch lever 87 with the first engageable claw 871 and the second engageable claw 872 is movable between the first position and the second position in order to switch suspension of rotation of the sun gear 80 and suspension of rotation of the internal gear 81 easily.

According to this arrangement, the clutch lever 87 may be urged by the contracting spring 88 to be located at the first position. Meanwhile, with the solenoid 89 being activated by the controller 90, the clutch lever 87 may move from the first position to the second position. Therefore, suspension of rotation of the sun gear 80 and suspension of rotation of the internal gear 81 may be switched promptly.

The switching assembly 8 in the present embodiment uses the planetary-gear carrier 83 as the input gear, to which the driving force from the motor 91 may be input, the sun gear 80 as the first output gear that may output the driving force, and the internal gear 81 as the second output gear that may output the driving force. Meanwhile, optionally, while the planetary-gear carrier 83 is used as the input gear, the internal gear 81 may be used to work as the first output gear, and the sun gear 80 may be used to work as the second output gear.

In this optional arrangement, in which the internal gear 81 is used as the first output gear and the sun gear 80 is used as the second output gear, the outer teeth 811 of the internal gear 81 may mesh with the first gear 844 of the first two-way clutch 84, and the first sun gear 802 of the sun gear 80 may mesh with the third gear 854 of the second two-way clutch 85. Moreover, the first engageable claw 871 of the clutch lever 87 may engage with the outer teeth 811 of the internal gear 81, and the second engageable claw 872 of the clutch lever 87 may engage with the first sun gear 802 of the sun gear 80.

In the optional arrangement, in which the internal gear 81 is used as the first output gear and the sun gear 80 is used as the second output gear, when the switching assembly 8 is in the first condition, the roller gear 72A and the intermediate ejection roller 72*a* may rotate in the first direction, which is in the optional arrangement the clockwise direction in FIGS. 2A-2B. When, on the other hand, the switching assembly 8 is in the second condition, the roller gear 72A and the intermediate ejection roller 72*a* may rotate in the second direction, which is in the optional arrangement the counter-clockwise direction in FIGS. 2A-2B.

Thus, in the arrangement, in which the planetary-gear carrier 83 is used as the input gear, one of the sun gear 80 and the internal gear 81 is used as the first output gear, and the other of the sun gear 80 and the internal gear 81 is used as the second output gear, the rotating direction of the first output gear to output the driving force and the rotating direction of the second output gear to output the driving force may be unified to the same direction. Moreover, the rotating speed of the first output gear and the second output gear may be increased with respect to the rotating speed of the input gear.

The first driving-force transmitter 8B may consist of the first two-way clutch 84 alone, and the second driving-force transmitter 8C may consist of the second two-way clutch 85 and the idle gear 86. In this arrangement, while the first driving-force transmitter 8B and the second driving-force transmitter 8C are in simple configurations, the rotating directions of the intermediate ejection roller 72*a* may be switched easily.

In this regard, however, if the switcher 8D is in an arrangement, in which the intermediate ejection roller 72*a* rotates in the first direction when the switching assembly 8 is in the first condition and rotates in the second direction opposite to the first direction when the switching assembly 8 is in the second condition, the first driving-force transmitter 8B and the second driving-force transmitter 8C may be provided with one or more idle gears.

The ejection roller 73*a* is enabled to rotate in the same direction and in the same speed as the intermediate ejection roller 72*a* by being connected with the roller gear 72A in the same transmission line. Moreover, a switching assembly similar to the switching assembly 8 may be provided to the ejection roller 73*a* so that the ejection roller 73*a* is enabled to rotate in the same direction and in the same speed as the intermediate ejection roller 72*a* by the driving force from the motor 91.

[Second Embodiment of Switching Assembly]

Figure 6A:
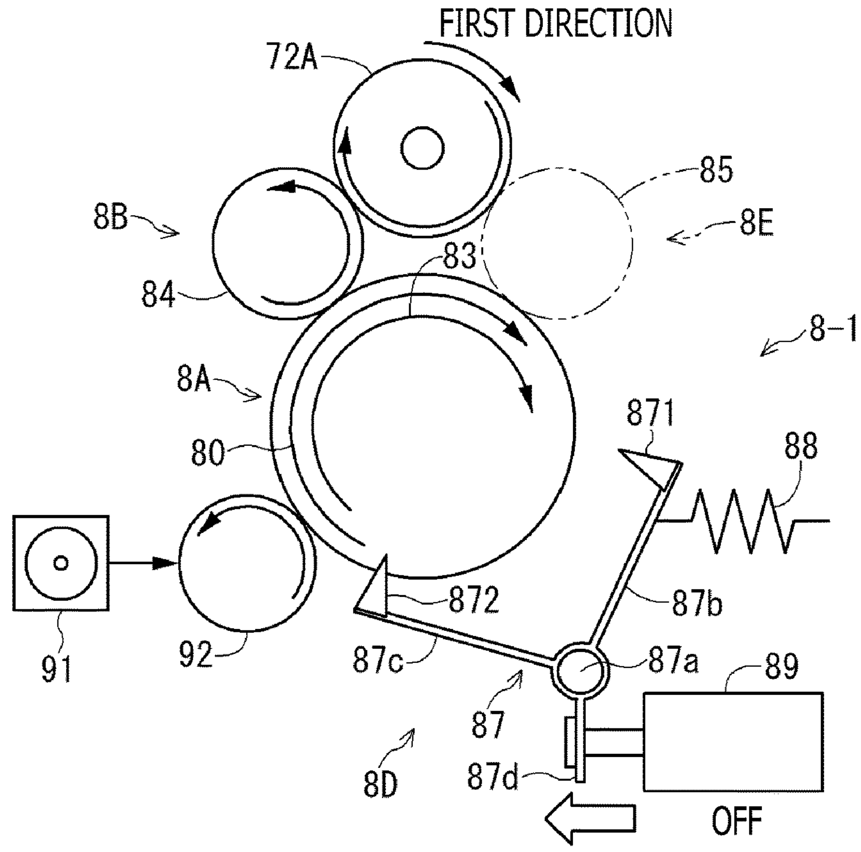
FIG. 6A is a sideward view of a switching assembly with a switcher in a first condition.
Figure 6B:
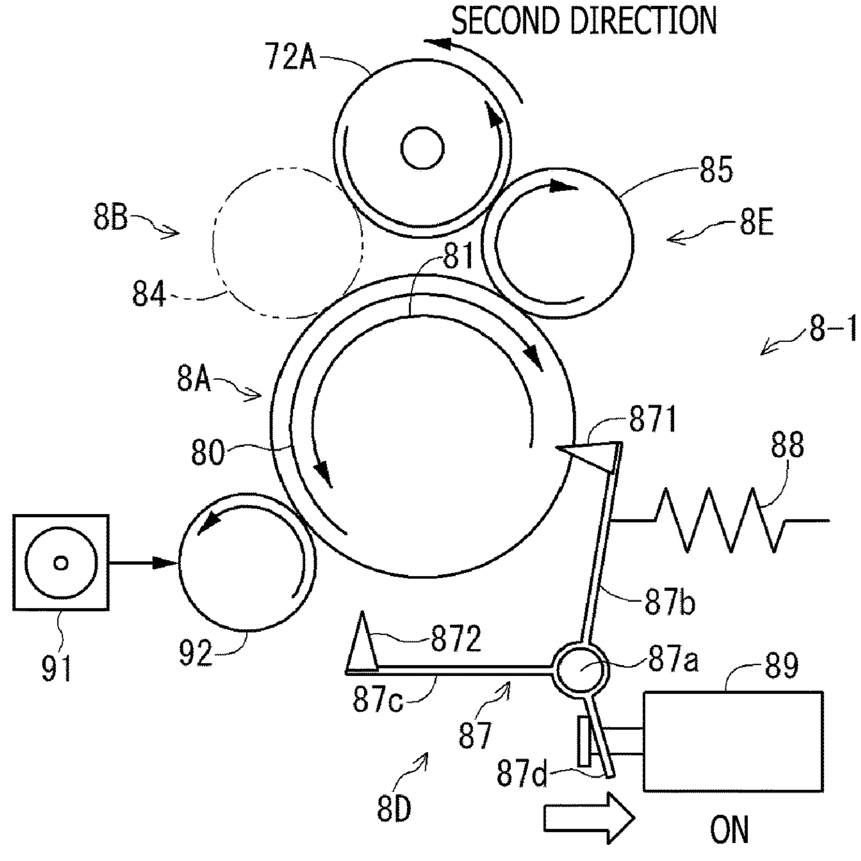
FIG. 6B is a sideward view of the switching assembly with the switcher in a second condition.
Figure 7:
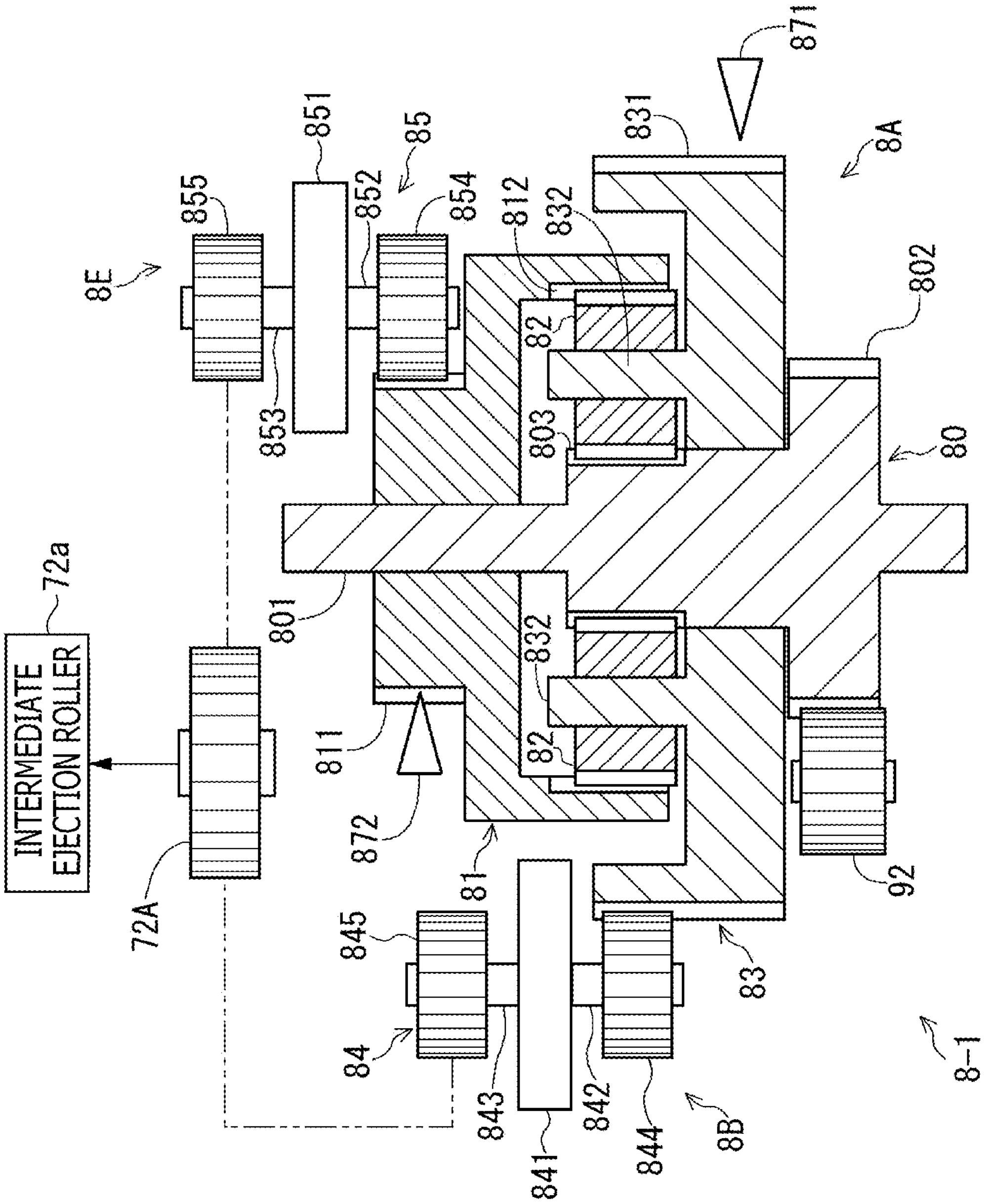
FIG. 7 is a cross-sectional planar view of the switching assembly.

As shown in FIGS. 6A-6B and 7, a switching assembly 8-1 in a second embodiment is different from the switching assembly 8, in which the planetary-gear carrier 83 in the planetary differential gear 8A is used as the input gear, the sun gear 80 is used as the first output gear, and the internal gear 81 is used as the second output gear, in that the switching assembly 8-1 uses the sun gear 80 in the planetary differential gear 8A as the input gear, the planetary-gear carrier 83 is used as the first output gear, and the internal gear 81 is used as the second output gear. Moreover, the switching assembly 8-1 is different form the switching assembly 8 in having a second driving-force transmitter 8E in place of the second driving-force transmitter 8C.

The second driving-force transmitter 8E has the second two-way clutch 85 forming a gear train, which connects the internal gear 81 and the intermediate ejection roller 72*a*, and which may transmit the driving force input from the internal gear 81 to the intermediate ejection roller 72*a* but not transmit the driving force input from the intermediate ejection roller 72*a* to the internal gear 81. The second driving-force transmitter 8E may consist of the second two-way clutch 85 alone.

In the switching assembly 8-1, the first sun gear 802 of the sun gear 80 working as the input gear meshes with the driving gear 92. The carrier gear 831 of the planetary-gear carrier 83 working as the first output gear meshes with the first gear 844 in the first two-way clutch 84.

The outer teeth 811 of the internal gear 81 working as the second output gear meshes with third gear 854 in the second two-way clutch 85. The fourth gear 855 in the second two-way clutch 85 meshes with the roller gear 72A. The fourth shaft 853 in the second two-way clutch 85 is connected with the intermediate ejection roller 72*a* through the fourth gear 855 and the roller gear 72A.

The remainder of the switching assembly 8-1 is substantially in the same configuration as the switching assembly 8; therefore, description of that is herein omitted.

[Behaviors of Switching Assembly 8-1]

As shown in FIG. 6A, when the solenoid 89 is inactive, the switcher 8D places the switching assembly 8-1 in the first condition, in which the clutch lever 87 is urged by the contracting spring 88 to be located at the first position, the first engageable claw 871 is separated from the planetary-gear carrier 83 to allow the planetary-gear carrier 83 to rotate, and the second engageable claw 872 engages with the internal gear 81 to suspend rotation of the internal gear 81.

In the first condition, as the motor 91 rotates counterclockwise, the driving force from the motor 91 may be transmitted to the sun gear 80, and the sun gear 80 may rotate clockwise. Thereby, the planetary-gear carrier 83 may rotate clockwise, and the driving force may be output from the planetary-gear carrier 83 to the first driving-force transmitter 8B. In this arrangement, the planetary-gear carrier 83 may rotate in the same rotating direction as the sun gear 80 in a reduced speed (see row R3 in FIG. 4). Meanwhile, the internal gear 81 is suspended by the second engageable claw 872 not to rotate; therefore, the driving force may not be output from the internal gear 81 to the second driving-force transmitter 8E.

As the driving force output from the planetary-gear carrier 83 is transmitted to the first gear 844 of the first two-way clutch 84 in the first driving-force transmitter 8B, the driving force may be further transmitted from the first gear 844 to the second gear 845, and the first gear 844 and the second gear 845 may rotate counterclockwise. As the second gear 845 rotates counterclockwise, the driving force may be transmitted from the second gear 845 to the roller gear 72A and the intermediate ejection roller 72*a*, and the roller gear 72A and the intermediate ejection roller 72*a* may rotate clockwise.

The direction, in which the roller gear 72A and the intermediate ejection roller 72*a* rotate in the first condition, e.g., the clockwise direction as indicated in FIG. 6A, may be called as the first direction. In other words, the roller gear 72A and the intermediate ejection roller 72*a* may rotate in the first direction in the first condition.

As the roller gear 72A rotates in the first direction, e.g., clockwise, the driving force may be transmitted from the roller gear 72A to the fourth gear 855 meshing with the roller gear 72A. However, the driving force transmitted from the roller gear 72A to the fourth gear 855 may not be transmitted to the third gear 854. Therefore, the third gear 854 meshing with the outer teeth 811 of the internal gear 81 may be maintained motionless without rotating.

As shown in FIG. 6B, when the solenoid 89 is activated by the controller 90, the switcher 8D places the switching assembly 8-1 in the second condition, in which the clutch lever 87 is moved by the solenoid 89 from the first position to the second position, the first engageable claw 871 engages with the planetary-gear carrier 83 to suspend rotation of the planetary-gear carrier 83, and the second engageable claw 872 is separated from the internal gear 81 to allow the internal gear 81 to rotate.

In the second condition, as the motor 91 may rotates counterclockwise, which is the same rotating direction as the first condition, the driving force from the motor 91 may be transmitted to the sun gear 80, and the sun gear 80 may rotate clockwise. Thereby, the internal gear 81 may rotate counterclockwise, and the driving force may be output from the internal gear 81 to the second driving-force transmitter 8E. In this arrangement, the internal gear 81 may rotate in the direction opposite to the sun gear 80 (see row R4 in FIG. 4). Meanwhile, the planetary-gear carrier 83 is suspended by the first engageable claw 871 from rotating; therefore, the driving force may not be output from the planetary-gear carrier 83 to the first driving-force transmitter 8B.

As the driving force output from the internal gear 81 is transmitted to the third gear 854 of the second two-way clutch 85 in the second driving-force transmitter 8E, the driving force may be transmitted from the third gear 854 to the fourth gear 855. In this arrangement, the third gear 854 and the fourth gear 855 may rotate clockwise. As the fourth gear 855 rotates clockwise, the driving force may be transmitted to the roller gear 72A and the intermediate ejection roller 72*a*. In this arrangement, the roller gear 72A and the intermediate ejection roller 72*a* may rotate counterclockwise.

The direction, in which the roller gear 72A and the intermediate ejection roller 72*a* rotate in the second condition, e.g., the counterclockwise direction as indicated in FIG. 6B, may be called as the second direction. In other words, the roller gear 72A and the intermediate ejection roller 72*a* may rotate in the second direction in the second condition.

As the roller gear 72A rotates in the second direction, e.g., counterclockwise, the driving force may be transmitted from the roller gear 72A to the second gear 845 in the first two-way clutch 84 meshing with the roller gear 72A. However, the driving force transmitted from the roller gear 72A to the second gear 845 may not be transmitted to the first gear 844. Therefore, the first gear 844 meshing with the carrier gear 831 in the planetary-gear carrier 83 may be maintained motionless without rotating.

Thus, the switcher 8D may switch the conditions of the switching assembly 8-1 between the first condition, in which the intermediate ejection roller 72*a* is rotated in the first direction by allowing the planetary-gear carrier 83 being the first output gear to output the driving force to the first driving-force transmitter 8B and suspending the internal gear 81 being the second output gear not to output the driving force to the second driving-force transmitter 8E, and the second condition, in which the intermediate ejection roller 72*a* is rotated in the second direction by suspending the planetary-gear carrier 83 not to output the driving force to the first driving-force transmitter 8B and allowing the internal gear 81 to output the driving force to the second driving-force transmitter 8E.

In this arrangement of the switching assembly 8-1, without switching the rotating directions of the motor 91, the rotating directions of the intermediate ejection roller 72*a* may be switched, and throughput for printing images in the image forming apparatus 1 may be restrained from lowering. Moreover, the motor 91 being the driving source to drive the intermediate ejection roller 72*a* may be used commonly as the driving source to drive the other drivable devices; therefore, manufacturing cost of the image forming apparatus 1 may be reduced.

The switching assembly 8-1 in the second embodiment uses the sun gear 80 as the input gear, to which the driving force from the motor 91 may be input, the planetary-gear carrier 83 as the first output gear that may output the driving force, and the internal gear 81 as the second output gear that may output the driving force. Meanwhile, optionally, while the sun gear 80 is used as the input gear, the internal gear 81 may be used as the first output gear, and the planetary-gear carrier 83 may be used as the second output gear.

In this optional arrangement, in which the internal gear 81 is used as the first output gear and the planetary-gear carrier 83 is used as the second output gear, the outer teeth 811 of the internal gear 81 may mesh with the first gear 844 in the first two-way clutch 84, and the carrier gear 831 of the planetary-gear carrier 83 may mesh with the third gear 854 in the second two-way clutch 85. Moreover, the first engageable claw 871 of the clutch lever 87 may engage with the outer teeth 811 of the internal gear 81, and the second engageable claw 872 of the clutch lever 87 may engage with the carrier gear 831 of the planetary-gear carrier 83.

In the optional arrangement, in which the internal gear 81 is used as the first output gear and the planetary-gear carrier 83 is used as the second output gear, when the switching assembly 8-1 is in the first condition, the driving force may be output from the internal gear 81 being the first output gear to the first driving-force transmitter 8B, and the roller gear 72A and the intermediate ejection roller 72*a* may rotate in the first direction, which is in the optional arrangement the counterclockwise direction in FIGS. 6A-6B.

As the sun gear 80 is rotated clockwise by the driving force from the motor 91 rotating counterclockwise, the internal gear 81 being the first output gear may rotate counterclockwise, which is the direction opposite to the sun gear 80, and the first gear 844 and the second gear 845 in the first two-way clutch 84 may rotate clockwise. Thereby, the roller gear 72A and the intermediate ejection roller 72*a* may rotate counterclockwise.

When the switching assembly 8-1 is in the second condition, the driving force may be output from the planetary-gear carrier 83 being the second output gear to the second driving-force transmitter 8E, and the roller gear 72A and the intermediate ejection roller 72*a* may rotate in the second direction, which is in the optional arrangement the clockwise direction in FIGS. 6A-6B.

As the sun gear 80 is rotated clockwise by the driving force from the motor 91 rotating counterclockwise, the planetary-gear carrier 83 being the second output gear may rotate clockwise, which is the same direction as the sun gear 80, in a reduced speed, and the third gear 854 and the fourth gear 855 in the second two-way clutch 85 may rotate counterclockwise. Thereby, the roller gear 72A and the intermediate ejection roller 72*a* may rotate clockwise.

Thus, in the arrangement where the sun gear 80 is used as the input gear, one of the planetary-gear carrier 83 and the internal gear 81 is used as the first output gear, and the other of the planetary-gear carrier 83 and the internal gear 81 is used as the second output gear, the rotating direction of the first output gear to output the driving force may be set to be opposite to the rotating direction of the second output gear outputting the driving force. Moreover, the rotating speed of the first output gear may be differed from the rotating speed of the second output gear.

Moreover, in the switching assembly 8-1, the first driving-force transmitter 8B may consist of the first two-way clutch 84 alone, and the second driving-force transmitter 8E may consist of the second two-way clutch 85 alone. Therefore, no idle gear may need to be provided to either the first driving-force transmitter 8B or the second driving-force transmitter 8E, and while the first driving-force transmitter 8B and the second driving-force transmitter 8E are in simple configurations, the rotating directions of the intermediate ejection roller 72*a* may be switched easily.

In this regard, however, if the switcher 8D is in an arrangement, in which the intermediate ejection roller 72*a* rotates in the first direction when the switching assembly 8-1 is in the first condition and rotates in the second direction opposite to the first direction when the switching assembly 8-1 is in the second condition, the first driving-force transmitter 8B and the second driving-force transmitter 8E may be provided with one or more idle gears.

[Third Embodiment of Switching Assembly]

Figure 8A:
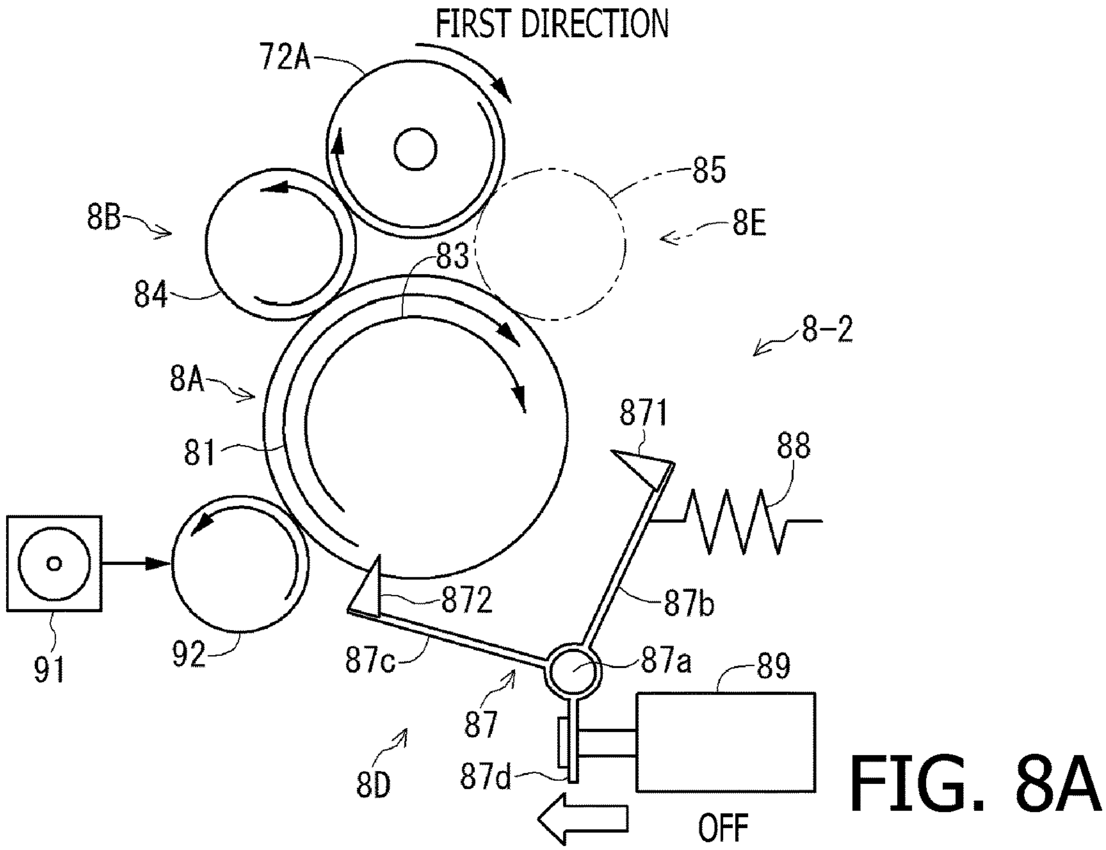
FIG. 8A is a sideward view of a switching assembly with a switcher in a first condition.
Figure 8B:
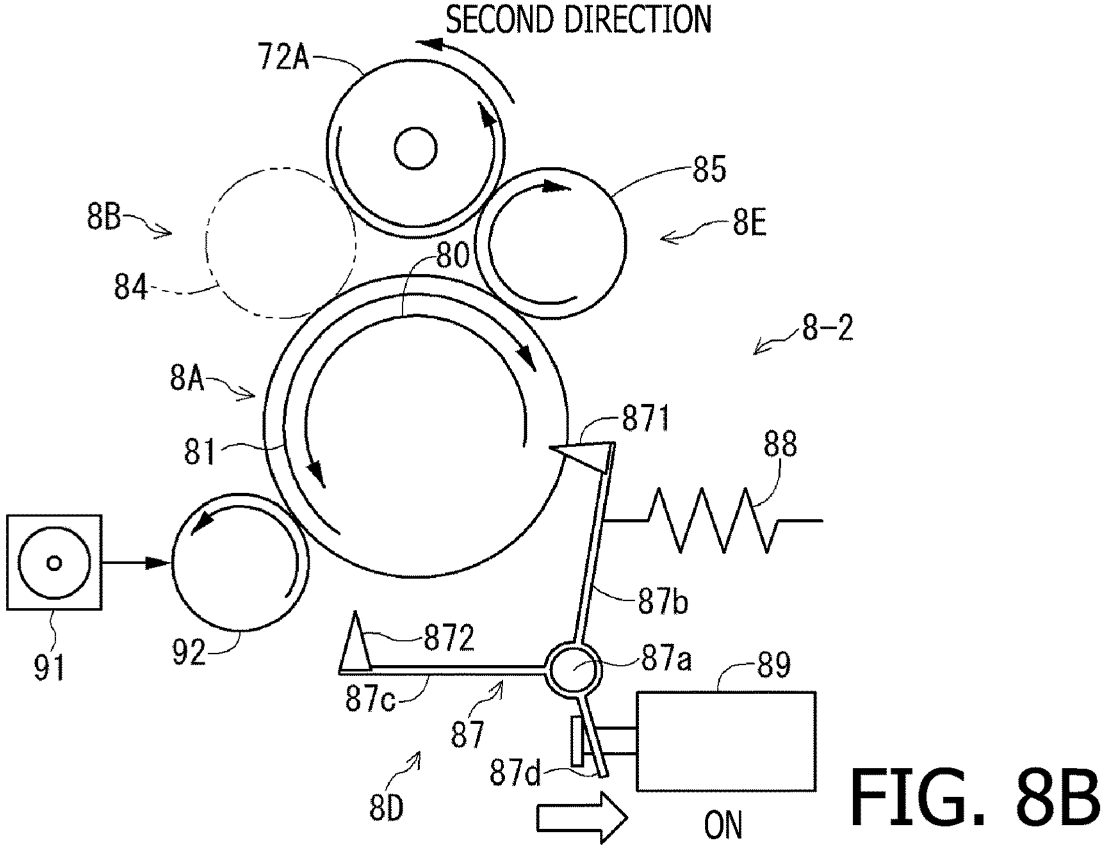
FIG. 8B is a sideward view of the switching assembly with the switcher in a second condition.
Figure 9:
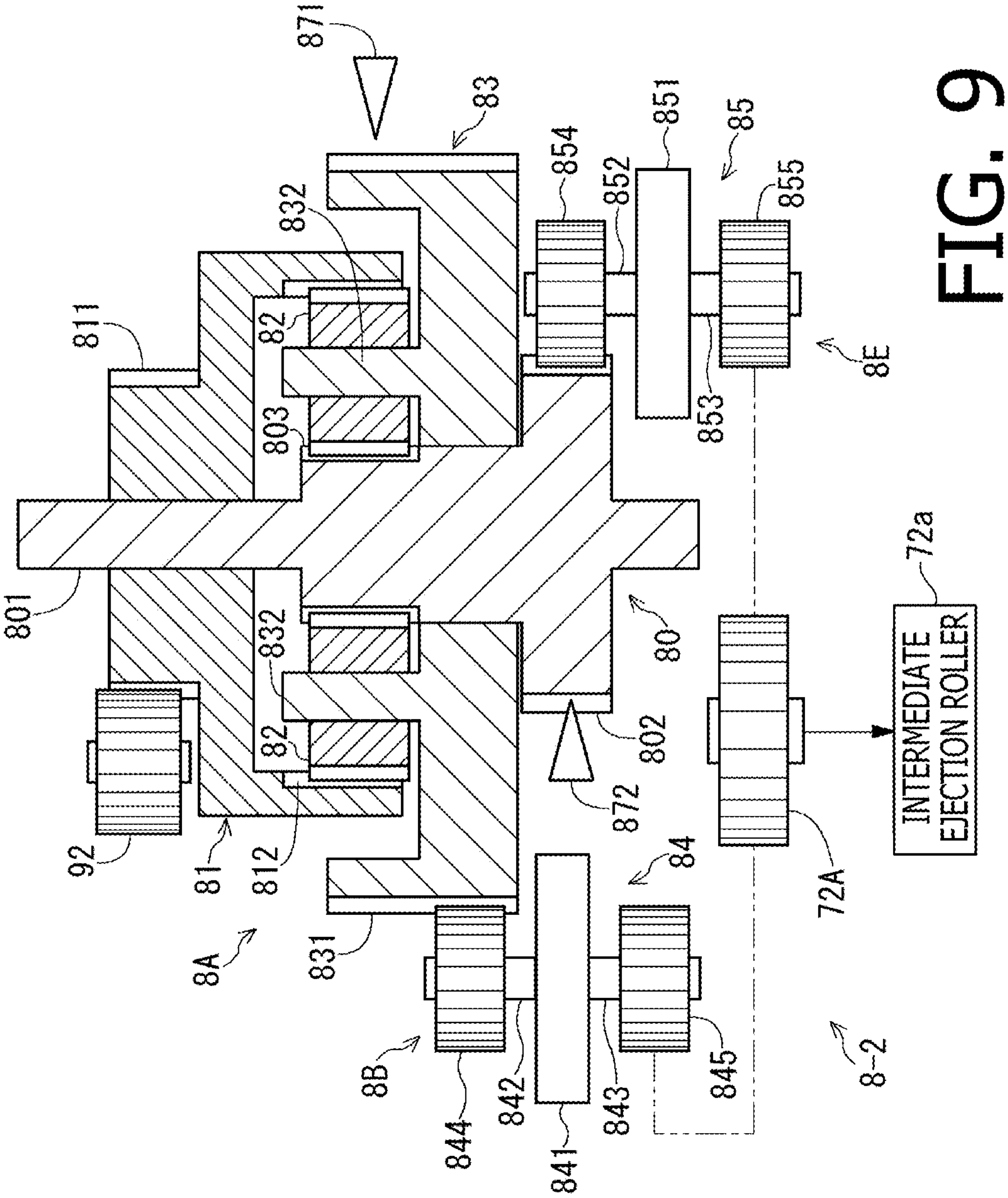
FIG. 9 is a cross-sectional planar view of the switching assembly.

As shown in FIGS. 8A-8B and 9, a switching assembly 8-2 in a third embodiment is different from the switching assembly 8, in which the planetary-gear carrier 83 in the planetary differential gear 8A is used as the input gear, the sun gear 80 is used as the first output gear, and the internal gear 81 is used as the second output gear, in that the switching assembly 8-2 uses the internal gear 81 in the planetary differential gear 8A as the input gear, the planetary-gear carrier 83 is used as the first output gear, and the sun gear 80 is used as the second output gear. Moreover, the switching assembly 8-2 is different form the switching assembly 8 in having the second driving-force transmitter 8E, similarly to the switching assembly 8-1, in place of the second driving-force transmitter 8C.

The second driving-force transmitter 8E has the second two-way clutch 85, which forms a gear train connecting the sun gear 80 and the intermediate ejection roller 72*a*. The second driving-force transmitter 8E may consist of the second two-way clutch 85 alone.

In the switching assembly 8-2, the outer teeth 811 of the internal gear 81 being the input gear meshes with the driving gear 92. The carrier gear 831 of the planetary-gear carrier 83 being the first output gear meshes with the first gear 844 in the first two-way clutch 84.

The first sun gear 802 of the sun gear 80 being the second output gear meshes with third gear 854 in the second two-way clutch 85. The fourth gear 855 in the second two-way clutch 85 meshes with the roller gear 72A. The fourth shaft 853 in the second two-way clutch 85 is connected with the intermediate ejection roller 72*a* through the fourth gear 855 and the roller gear 72A.

The remainder of the switching assembly 8-2 is in the same configuration as the switching assembly 8; therefore, description of that is herein omitted.

[Behaviors of Switching Assembly 8-2]

As shown in FIG. 8A, when the solenoid 89 is inactive, the switcher 8D places the switching assembly 8-2 in the first condition, in which the clutch lever 87 is urged by the contracting spring 88 to the first position, the first engageable claw 871 is separated from the planetary-gear carrier 83 to allow the planetary-gear carrier 83 to rotate, and the second engageable claw 872 engages with the sun gear 80 to suspend rotation of the sun gear 80.

In the first condition, as the motor 91 rotates counterclockwise, the driving force from the motor 91 may be transmitted to the internal gear 81, and the internal gear 81 may rotate clockwise. Thereby, the planetary-gear carrier 83 may rotate clockwise, and the driving force may be output from the planetary-gear carrier 83 to the first driving-force transmitter 8B. In this arrangement, the planetary-gear carrier 83 may rotate in the same rotating direction as the internal gear 81 in a reduced speed (see row R5 in FIG. 4). Meanwhile, the sun gear 80 is suspended by the second engageable claw 872 from rotating; therefore, the driving force may not be output from the sun gear 80 to the second driving-force transmitter 8E.

As the driving force output from the planetary-gear carrier 83 is transmitted to the first gear 844 in the first two-way clutch 84 in the first driving-force transmitter 8B, the driving force may be further transmitted from the first gear 844 to the second gear 845, and the first gear 844 and the second gear 845 may rotate counterclockwise. As the second gear 845 rotates counterclockwise, the driving force may be transmitted to the roller gear 72A and the intermediate ejection roller 72*a*, and the roller gear 72A and the intermediate ejection roller 72*a* may rotate clockwise.

The direction, in which the roller gear 72A and the intermediate ejection roller 72*a* rotate in the first condition, e.g., the clockwise direction as indicated in FIG. 8A, may be called as the first direction. In other words, the roller gear 72A and the intermediate ejection roller 72*a* may rotate in the first direction in the first condition.

As the roller gear 72A rotates in the first direction, e.g., clockwise, the driving force may be transmitted from the roller gear 72A to the fourth gear 855 meshing with the roller gear 72A. However, the driving force transmitted from the roller gear 72A to the fourth gear 855 may not be transmitted to the third gear 854. Therefore, the third gear 854 meshing with the first sun gear 802 of the sun gear 80 may be maintained motionless without rotating.

As shown in FIG. 8B, when the solenoid 89 is activated by the controller 90, the switcher 8D places the switching assembly 8-1 in the second condition, in which the clutch lever 87 is moved by the solenoid 89 from the first position to the second position, the first engageable claw 871 engages with the planetary-gear carrier 83 to suspend rotation of the planetary-gear carrier 83, and the second engageable claw 872 is separated from the sun gear 80 to allow the sun gear 80 to rotate.

In the second condition, as the motor 91 rotates counterclockwise, which is the same rotating direction as the first condition, the driving force from the motor 91 may be transmitted to the internal gear 81, and the internal gear 81 may rotate clockwise. Thereby, the sun gear 80 may rotate counterclockwise, and the driving force may be output from the sun gear 80 to the second driving-force transmitter 8E. In this arrangement, the sun gear 80 may rotate in the direction opposite to the internal gear 81 (see row R6 in FIG. 4). Meanwhile, the planetary-gear carrier 83 is suspended by the first engageable claw 871 from rotating; therefore, the driving force may not be output from the planetary-gear carrier 83 to the first driving-force transmitter 8B.

As the driving force output from the sun gear 80 is transmitted to the third gear 854 of the second two-way clutch 85 in the second driving-force transmitter 8E, the driving force may be transmitted from the third gear 854 to the fourth gear 855. In this arrangement, the third gear 854 and the fourth gear 855 may rotate clockwise. As the fourth gear 855 rotates clockwise, the driving force may be transmitted to the roller gear 72A and the intermediate ejection roller 72*a*. In this arrangement, the roller gear 72A and the intermediate ejection roller 72*a* may rotate counterclockwise.

The direction, in which the roller gear 72A and the intermediate ejection roller 72*a* rotate in the second condition, e.g., the counterclockwise direction as indicated in FIG. 8B, may be called as the second direction. In other words, the roller gear 72A and the intermediate ejection roller 72*a* may rotate in the second direction in the second condition.

As the roller gear 72A rotates in the second direction, e.g., counterclockwise, the driving force may be transmitted from the roller gear 72A to the second gear 845 in the first two-way clutch 84 meshing with the roller gear 72A. However, the driving force transmitted from the roller gear 72A to the second gear 845 may not be transmitted to the first gear 844. Therefore, the first gear 844 meshing with the carrier gear 831 in the planetary-gear carrier 83 may be maintained motionless without rotating.

Thus, the switcher 8D may switch the conditions of the switching assembly 8-2 between the first condition, in which the intermediate ejection roller 72*a* is rotated in the first direction by allowing the planetary-gear carrier 83 being the first output gear to output the driving force to the first driving-force transmitter 8B and suspending the sun gear 80 being the second output gear not to output the driving force to the second driving-force transmitter 8E, and the second condition, in which the intermediate ejection roller 72*a* is rotated in the second direction by suspending the planetary-gear carrier 83 not to output the driving force to the first driving-force transmitter 8B and allowing the sun gear 80 to output the driving force to the second driving-force transmitter 8E.

In this arrangement of the switching assembly 8-2, without switching the rotating directions of the motor 91, the rotating directions of the intermediate ejection roller 72*a* may be switched, and throughput for printing images in the image forming apparatus 1 may be restrained from lowering. Moreover, the motor 91 being the driving source to drive the intermediate ejection roller 72*a* may be used commonly as the driving source to drive the other drivable devices; therefore, manufacturing cost of the image forming apparatus 1 may be reduced.

The switching assembly 8-2 in the third embodiment uses the internal gear 81 as the input gear, to which the driving force from the motor 91 may be input, the planetary-gear carrier 83 as the first output gear that may output the driving force, and the sun gear 80 as the second output gear that may output the driving force. Meanwhile, optionally, while the internal gear 81 is used as the input gear, the sun gear 80 may be used as the first output gear, and the planetary-gear carrier 83 may be used as the second output gear.

In this optional arrangement, in which the sun gear 80 is used as the first output gear and the planetary-gear carrier 83 is used as the second output gear, the first sun gear 802 of the sun gear 80 may mesh with the first gear 844 in the first two-way clutch 84, and the carrier gear 831 of the planetary-gear carrier 83 may mesh with the third gear 854 in the second two-way clutch 85. Moreover, the first engageable claw 871 of the clutch lever 87 may engage with the first sun gear 802 of the sun gear 80, and the second engageable claw 872 of the clutch lever 87 may engage with the carrier gear 831 of the planetary-gear carrier 83.

In the optional arrangement, in which the sun gear 80 is used as the first output gear and the planetary-gear carrier 83 is used as the second output gear, when the switching assembly 8-2 is in the first condition, the driving force may be output from the sun gear 80 being the first output gear to the first driving-force transmitter 8B, and the roller gear 72A and the intermediate ejection roller 72*a* may rotate in the first direction, which is in the optional arrangement the counterclockwise direction in FIGS. 8A-8B.

As the internal gear 81 is rotated clockwise by the driving force from the motor 91 rotating counterclockwise, the sun gear 80 being the first output gear may rotate counterclockwise, which is the direction opposite to the internal gear 81, and the first gear 844 and the second gear 845 in the first two-way clutch 84 may rotate clockwise. Thereby, the roller gear 72A and the intermediate ejection roller 72*a* may rotate counterclockwise.

When the switching assembly 8-2 is in the second condition, the driving force may be output from the planetary-gear carrier 83 being the second output gear to the second driving-force transmitter 8E, and the roller gear 72A and the intermediate ejection roller 72*a* may rotate in the second direction, which is in the optional arrangement the clockwise direction in FIGS. 8A-8B.

As the internal gear 81 is rotated clockwise by the driving force from the motor 91 rotating counterclockwise, the planetary-gear carrier 83 being the second output gear may rotate clockwise, which is the same direction as the internal gear 81, in a reduced speed, and the third gear 854 and the fourth gear 855 in the second two-way clutch 85 may rotate counterclockwise. Thereby, the roller gear 72A and the intermediate ejection roller 72*a* may rotate clockwise.

Thus, in the arrangement where the internal gear 81 is used as the input gear, one of the sun gear 80 and the planetary-gear carrier 83 is used as the first output gear, and the other of the sun gear 80 and the planetary-gear carrier 83 is used as the second output gear, the rotating direction of the first output gear to output the driving force may be set to be opposite to the rotating direction of the second output gear outputting the driving force. Moreover, the rotating speed of the first output gear may be differed from the rotating speed of the second output gear.

Moreover, in the switching assembly 8-2, similarly to the switching assembly 8-1, no idle gear may need to be provided in either the first driving-force transmitter 8B or the second driving-force transmitter 8E, and while the first driving-force transmitter 8B and the second driving-force transmitter 8E are in simple configurations, the rotating directions of the intermediate ejection roller 72*a* may be switched easily.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming apparatus, comprising:

an image forming device configured to form an image on a sheet being conveyed;

a reversible roller located downstream from the image forming device in a sheet-conveying direction, the reversible roller being rotatable in a first direction and a second direction opposite to the first direction;

a motor being a driving source for the reversible roller;

a switching assembly configured to switch rotating directions of the reversible roller in a state where the motor is rotating in one direction, the switching assembly having:

a planetary differential gear having an input gear configured to be driven to rotate by a driving force input from the motor, a first output gear and a second output gear configured to output the driving force transmitted thereto, and a planetary gear configured to transmit the driving force from the input gear to the first output gear and the second output gear;

a first driving-force transmitter connecting the first output gear and the reversible roller, the first driving-force transmitter having a first clutch, the first clutch being configured to transmit the driving force input thereto from the first output gear to the reversible roller but not to transmit the driving force input thereto from the reversible roller to the first output gear;

a second driving-force transmitter connecting the second output gear and the reversible roller, the second driving-force transmitter having a second clutch, the second clutch being configured to transmit the driving force input thereto from the second output gear to the reversible roller but not to transmit the driving force input thereto from the reversible roller to the second output gear; and a switcher configured to switch conditions of the switching assembly between a first condition, in which the reversible roller is rotated in the first direction by allowing the first output gear to output the driving force to the first driving-force transmitter and suspending the second output gear not to output the driving force to the second driving-force transmitter, and a second condition, in which the reversible roller is rotated in the second direction by suspending the first output gear not to output the driving force to the first driving-force transmitter and allowing the second output gear to output the driving force to the second driving-force transmitter.

2. The image forming apparatus according to claim 1, wherein the first clutch has a first shaft connected to the first output gear and a second shaft connected to the reversible roller, the first clutch being a two-way clutch configured to transmit the driving force transmitted from the first output gear to the first shaft to the second shaft but not to transmit the driving force transmitted from the reversible roller to the second shaft to the first shaft, and the second clutch has a third shaft connected to the second output gear and a fourth shaft connected to the reversible roller, the second clutch being a two-way clutch configured to transmit the driving force transmitted from the second output gear to the third shaft to the fourth shaft but not to transmit the driving force transmitted from the reversible roller to the fourth shaft to the third shaft.

3. The image forming apparatus according to claim 1, wherein the switcher is configured to suspend one of rotation of the first output gear and rotation of the second output gear alternatively.

4. The image forming apparatus according to claim 3, wherein the switcher has a clutch lever, the clutch lever having:

a first engageable claw configured to engage with the first output gear to suspend the rotation of the first output gear; and a second engageable claw configured to engage with the second output gear to suspend the rotation of the second output gear, and the clutch lever is configured to move between a first position, at which the first engageable claw is separated from the first output gear and the second engageable claw engages with the second output gear, and a second position, at which the first engageable claw engages with the first output gear and the second engageable claw is separated from the second output gear.

5. The image forming apparatus according to claim 4, wherein the switcher has a contracting spring urging the clutch lever to be located at the first position and a solenoid configured to move the clutch lever from the first position toward the second position, the image forming apparatus further comprises a controller configured to control behavior of the solenoid, and the controller is configured to activate the solenoid for causing the solenoid to move the clutch lever from the first position toward the second position.

6. The image forming apparatus according to claim 1, wherein the input gear is a planetary-gear carrier retaining the planetary gear rotatably, the first output gear is one of a sun gear meshing with the planetary gear and an internal gear meshing with the planetary gear, and the second output gear is the other of the sun gear and the internal gear.

7. The image forming apparatus according to claim 6, further comprising a reversible-roller gear configured to rotate integrally with the reversible roller, wherein the first driving-force transmitter consists of the first clutch alone, the second driving-force transmitter consists of the second clutch and an idle gear meshing with the reversible-roller gear, the first clutch has a first gear meshing with the first output gear and a second gear meshing with the reversible-roller gear, the first clutch being a two-way clutch configured to transmit the driving force transmitted from the first output gear to the first gear to the second gear but not to transmit the driving force transmitted from the reversible roller to the second gear to the first gear, and the second clutch has a third gear meshing with the second output gear and a fourth gear meshing with the idle gear, the second clutch being a two-way clutch configured to transmit the driving force transmitted from the second output gear to the third gear to the fourth gear but not to transmit the driving force transmitted from the reversible roller to the fourth gear to the third gear.

8. The image forming apparatus according to claim 1, wherein the input gear is one of a sun gear meshing with the planetary gear and an internal gear meshing with the planetary gear, the first output gear is one of the other of the sun gear and the internal gear and a planetary-gear carrier, the planetary-gear carrier retaining the planetary gear rotatably, and the second output gear is the other of the other of the sun gear and the internal gear and the planetary-gear carrier.

9. The image forming apparatus according to claim 8, further comprising a reversible-roller gear configured to rotate integrally with the reversible roller, wherein the first driving-force transmitter consists of the first clutch alone, the second driving-force transmitter consists of the second clutch alone, the first clutch has a first gear meshing with the first output gear and a second gear meshing with the reversible-roller gear, the first clutch being a two-way clutch configured to transmit the driving force transmitted from the first output gear to the first gear to the second gear but not to transmit the driving force transmitted from the reversible roller to the second gear to the first gear, and the second clutch has a third gear meshing with the second output gear and a fourth gear meshing with the reversible-roller gear, the second clutch being a two-way clutch configured to transmit the driving force transmitted from the second output gear to the third gear to the fourth gear but not to transmit the driving force transmitted from the reversible roller to the fourth gear to the third gear.

10. The image forming apparatus according to claim 1, wherein the image forming device has a photosensitive drum and a transfer roller, the image forming apparatus further comprises a fuser located at a position downstream from the image forming device in the sheet-conveying direction, the fuser being configured to fix an image formed in a toner onto the sheet, and the reversible roller is located at a position downstream from the fuser in the sheet-conveying direction.

11. A sheet conveyor, comprising:

a reversible roller configured to convey a sheet, the reversible roller being rotatable in a first direction and a second direction opposite to the first direction;

a motor being a driving source for the reversible roller;

a switching assembly configured to switch rotating directions of the reversible roller in a state where the motor is rotating in one direction, the switching assembly having:

a planetary differential gear having an input gear configured to be driven to rotate by a driving force input from the motor, a first output gear and a second output gear configured to output the driving force transmitted thereto, and a planetary gear configured to transmit the driving force from the input gear to the first output gear and the second output gear;

a first gear train connecting the first output gear and the reversible roller, the first gear train having a first clutch, the first clutch being configured to transmit the driving force input thereto from the first output gear to the reversible roller but not to transmit the driving force input thereto from the reversible roller to the first output gear; and a second gear train connecting the second output gear and the reversible roller, the second gear train having a second clutch, the second clutch being configured to transmit the driving force input thereto from the second output gear to the reversible roller but not to transmit the driving force input thereto from the reversible roller to the second output gear; and a clutch lever having:

a first engageable claw configured to engage with the first output gear to suspend rotation of the first output gear; and a second engageable claw configured to engage with the second output gear to suspend rotation of the second output gear, wherein the clutch lever is configured to move between a first position, at which the first engageable claw is separated from the first output gear and the second engageable claw engages with the second output gear, and a second position, at which the first engageable claw engages with the first output gear and the second engageable claw is separated from the second output gear.

12. The sheet conveyor according to claim 11, wherein the first clutch has a first shaft connected to the first output gear and a second shaft connected to the reversible roller, the first clutch being a two-way clutch configured to transmit the driving force transmitted from the first output gear to the first shaft to the second shaft but not to transmit the driving force transmitted from the reversible roller to the second shaft to the first shaft, and the second clutch has a third shaft connected to the second output gear and a fourth shaft connected to the reversible roller, the second clutch being a two-way clutch configured to transmit the driving force transmitted from the second output gear to the third shaft to the fourth shaft but not to transmit the driving force transmitted from the reversible roller to the fourth shaft to the third shaft.

13. The sheet conveyor according to claim 11, wherein the reversible roller is configured to be rotated in the first direction when the clutch lever is at the first position, and the reversible roller is configured to be rotated in the second direction when the clutch lever is at the second position.

14. The sheet conveyor according to claim 11, further comprising:

a contracting spring urging the clutch lever to be located at the first position;

a solenoid configured to move the clutch lever from the first position toward the second position; and a controller configured to control behavior of the solenoid, and wherein the controller is configured to activate the solenoid for causing the solenoid to move the clutch lever from the first position toward the second position.

15. The sheet conveyor according to claim 11, wherein the input gear is a planetary-gear carrier retaining the planetary gear rotatably, the first output gear is one of a sun gear meshing with the planetary gear and an internal gear meshing with the planetary gear, and the second output gear is the other of the sun gear and the internal gear.

16. The sheet conveyor according to claim 15, further comprising a reversible-roller gear configured to rotate integrally with the reversible roller, wherein the first gear train consists of the first clutch alone, the second gear train consists of the second clutch and an idle gear meshing with the reversible-roller gear, the first clutch has a first gear meshing with the first output gear and a second gear meshing with the reversible-roller gear, the first clutch being a two-way clutch configured to transmit the driving force transmitted from the first output gear to the first gear to the second gear but not to transmit the driving force transmitted from the reversible roller to the second gear to the first gear, and the second clutch has a third gear meshing with the second output gear and a fourth gear meshing with the idle gear, the second clutch being a two-way clutch configured to transmit the driving force transmitted from the second output gear to the third gear to the fourth gear but not to transmit the driving force transmitted from the reversible roller to the fourth gear to the third gear.

17. The sheet conveyor according to claim 11, wherein the input gear is one of a sun gear meshing with the planetary gear and an internal gear meshing with the planetary gear, the first output gear is one of the other of the sun gear and the internal gear and a planetary-gear carrier, the planetary-gear carrier retaining the planetary gear rotatably, and the second output gear is the other of the other of the sun gear and the internal gear and the planetary-gear carrier.

18. The sheet conveyor according to claim 17, further comprising a reversible-roller gear configured to rotate integrally with the reversible roller, wherein the first gear train consists of the first clutch alone, the second gear train consists of the second clutch alone, the first clutch has a first gear meshing with the first output gear and a second gear meshing with the reversible-roller gear, the first clutch being a two-way clutch configured to transmit the driving force transmitted from the first output gear to the first gear to the second gear but not to transmit the driving force transmitted from the reversible roller to the second gear to the first gear, and the second clutch has a third gear meshing with the second output gear and a fourth gear meshing with the reversible-roller gear, the second clutch being a two-way clutch configured to transmit the driving force transmitted from the second output gear to the third gear to the fourth gear but not to transmit the driving force transmitted from the reversible roller to the fourth gear to the third gear.

19. An image forming apparatus, comprising:

a photosensitive drum;

a reversible roller configured to convey a sheet, the reversible roller being located downstream from the photosensitive drum in a sheet-conveying direction, the reversible roller being rotatable in a first direction and a second direction opposite to the first direction;

a motor being a driving source for the reversible roller;

a switching assembly configured to switch rotating directions of the reversible roller in a state where the motor is rotating in one direction, the switching assembly having:

a planetary differential gear having an input gear configured to be driven to rotate by a driving force input from the motor, a first output gear and a second output gear configured to output the driving force transmitted thereto, and a planetary gear configured to transmit the driving force from the input gear to the first output gear and the second output gear;

a first gear train connecting the first output gear and the reversible roller, the first gear train having a first clutch, the first clutch being configured to transmit the driving force input thereto from the first output gear to the reversible roller but not to transmit the driving force input thereto from the reversible roller to the first output gear; and a second gear train connecting the second output gear and the reversible roller, the second gear train having a second clutch, the second clutch being configured to transmit the driving force input thereto from the second output gear to the reversible roller but not to transmit the driving force input thereto from the reversible roller to the second output gear; and a clutch lever, having:

a first engageable claw configured to engage with the first output gear to suspend rotation of the first output gear; and a second engageable claw configured to engage with the second output gear to suspend rotation of the second output gear, wherein the clutch lever is configured to move between a first position, at which the first engageable claw is separated from the first output gear and the second engageable claw engages with the second output gear, and a second position, at which the first engageable claw engages with the first output gear and the second engageable claw is separated from the second output gear.

20. The image forming apparatus according to claim 19, further comprising a fuser located at a position downstream from the photosensitive drum in the sheet-conveying direction, the fuser being configured to fix an image formed in a toner onto the sheet, wherein the reversible roller is located at a position downstream from the fuser in the sheet-conveying direction.

* * * * *